Jan. 4, 1927.  M. BEREK  1,613,583
ILLUMINATOR FOR MICROSCOPES
Filed May 20, 1924
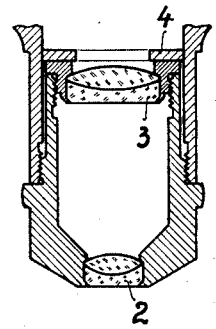
Fig. 1.
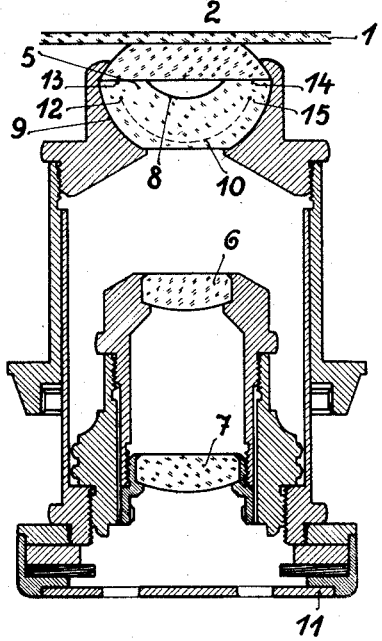
Fig. 2.
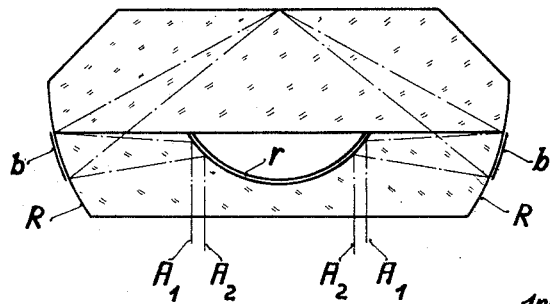
Witness: Fritz Ingelmann
Inventor: Max Berek.

Patented Jan. 4, 1927.

1,613,583

UNITED STATES PATENT OFFICE.

MAX BEREK, OF WETZLAR, GERMANY, ASSIGNOR TO THE FIRM ERNST LEITZ, OPTISCHE WERKE, OF WETZLAR, GERMANY.

ILLUMINATOR FOR MICROSCOPES.

Application filed May 20, 1924, Serial No. 714,732, and in Germany January 17, 1924.

The present invention relates to microscope illuminators and more especially to reflecting condensers for dark field illumination and has for its object to construct and arrange the reflecting condenser so that dark field illumination is ensured throughout the whole range of vision, and so that it is possible to use the full power of the employed microscope objective without stopping down its aperture.

In using reflecting condensers for dark field illumination as previously known a not inconsiderable range of the numerical aperture must remain unused between the upper limit of the aperture of the employed objective and the lower limit of the aperture of the reflecting condenser in order to obtain a complete dark field illumination for the whole field of vision. The cause of this phenomenon is to be found in that in all previous reflecting condensers the aperture limits in the illuminator vary to a considerable extent with the distance from the axis of the system; the object to be illuminated and observed being greater than a mathematical point. Therefore at the edges of the field of vision bright field illumination would occur, and this so much more, the greater the objective field of vision of the employed microscope objective. In order to avoid this, the aperture of the objective must be stopped down and a range of aperture of the objective not unimportant for resolving power and brightness is thus lost.

According to the invention the reflecting condenser is so constructed and arranged that a delimitation of the light rays is effective on the surface which is conjugate to the aperture stop of the microscope objective. This place will be found by reproducing the exit-pupil of the microscope objective into the object space by means of said objective and the reflecting condenser.

If with a reflecting condenser consisting of two reflecting surfaces of rotation it is desired to obtain at the same time a good isoplanatic correction, this can be obtained if the equation $$0.14 \frac{R}{r} \frac{b}{A_1 - A_2} = f$$

is satisfied at least approximately, where $R$ and $r$ are the radii of curvature of the two reflecting surfaces (taken at their absolute value), $f$ is the focal length of the condenser, $A_1$ and $A_2$ are its limiting numerical apertures, and $b$ is the active breadth of the annular zone on the surface of radius $R$.

With such a construction very satisfactory results as regards brightness and resolving power are also obtained if the equation $$\frac{R}{r} \frac{b}{f} = 1$$

is satisfied.

With reflecting condensers, whose reflecting surfaces are ground on a glass body, the surface which is conjugated to the aperture stop of the microscope objective, often lies within the material of the glass body. In such a case the glass body may be divided into two parts along this surface and a stop may be inserted between the two parts to limit the path of the light rays in the desired manner.

The desired result may, however, be obtained optically by means of a suitable optical system which projects on to the surface in question an image of a diaphragm having an annular opening. With such a construction it is possible in practice to avoid the previously unused aperture range. It is true, however, that this construction requires a more considerable acquaintance with the specific conditions necessary for limiting the path of light rays in optical instruments than is commonly encountered in microscopy.

In practice the following method may therefore well be adopted. Since the reflecting surfaces of the reflecting condensers are produced by silvering, only closely limited narrow annular zones are silvered, and in this way the desired delimitation of the path of the light rays can be obtained. Generally it is sufficient to do this on one reflecting surface only, and in this case the surface chosen is preferably that with the greater radius of curvature.

Two constructions according to the invention are illustrated by way of example in the accompanying drawings, in which Figure 1 shows in a more schematic manner a condenser provided with an optical system for limiting the path of the light rays, and Figure 2 illustrates a condenser in which the desired result is obtained by suitable silvering only.

In Figure 1 above an object slide 1 is a microscope objective consisting of two lenses 2 and 3, the exit-pupil of which is limited by a stop 4. Beneath the object slide 1 is a reflecting condenser 5 which is connected to a system consisting of two condensing lenses 6 and 7. The reflecting condenser 5 has two curved surfaces 8 and 9 which reflect the light rays to the object slide 1. Between the said surfaces 8 and 9 along a rotary surface 10 (shown dotted) lies the real image of the plane containing the stop 4 which is projected by the microscope objective 2, 3 and the reflecting surface 9 of the condenser 5.

At a suitable distance below the condensing lens system 6, 7 is a diaphragm 11 which allows a bundle of light rays of annular cross-section to pass. An image of this diaphragm 11 is formed by the lens system 6, 7 and the reflecting surface 8 of the reflecting condenser 5, and this image lies on the surface 10. The annular opening of the diaphragm 11 corresponds to a zone in the reflecting condenser 5 defined by the points 12, 13, 14 and 15 along the said surface 10. The annular opening of the diaphragm 11 is so chosen that its image in the condenser (i. e. the zone defined by 12, 13, 14 and 15) produces the desired delimitation of the path of light rays in the condenser 5.

This effect can be obtained without using the system 6, 7 and the diaphragm 11 if the glass body forming the condenser 5 is divided along the surface 10 and a diaphragm is inserted between the two parts, so as to allow only those light rays to pass which lie within the zone defined by 12, 13, 14 and 15.

Figure 2 shows the radii of the reflecting surfaces and the breadth of a silvered annular zone in a construction which, without employing auxiliary devices, gives the desired results in a form sufficiently good for ordinary practical work. Good results are obtained when according to the mentioned equations the radius R of the outer reflecting surface is 23 mms., the radius $r$ of the inner reflecting surface is 11 mms., whereby the focal length of the condenser is 10 mms. The breadth of the silvered annular zone on the surface with the radius R=23 mms. is 4.8 mms., and the two limiting numerical apertures $A_1$ and $A_2$ are respectively 1, 33 and 1, 20.

I wish to be understood that I do not desire to be limited to the exact details of construction shown and described for obvious modifications will occur to a person skilled in the art.

Having thus described my invention, what I claim and desire to secure by Letters Patent is:

1. A reflecting condenser for dark field illumination consisting of a glass body having two concentric surfaces of revolution, a narrow annular reflecting zone of silvering or platinizing placed upon the upper portion of the outer reflecting surface which surface has the larger radius of revolution, the focal length of the condenser being approximately equal to $$0.14 \frac{R}{r} \frac{b}{A_1 - A_2} = f$$

where R is the radius of the surface with the greater curvature, $r$ the radius of the surface with the smaller curvature, $f$ the focal length of the condenser, $A_1$ and $A_2$ are the two limiting apertures of the condenser and $b$ is the breadth of the active annular zone of silvering or platinizing on the surface with the radius R.

2. A reflecting condenser for dark field illumination consisting of a glass body having two concentric surfaces of revolution, a narrow annular reflecting zone of silvering or platinizing placed upon the upper portion of the outer reflecting surface which surface has the larger radius of revolution, the equation $$\frac{R}{r} \frac{b}{f} = 1$$

being at least approximately satisfied, where R is the radius of the surface with the greater curvature, $r$ the radius of the surface with the smaller curvature, $b$ is the active annular zone of silvering or platinizing on the surface with the radius R and $f$ is the focal length of the condenser.

3. A reflecting condenser for dark field illumination consisting of a glass body having two concentric surfaces of revolution, a narrow annular reflecting zone of silvering or platinizing placed upon the upper portion of the outer reflecting surface which surface has the larger radius of revolution, the breadth of which zone being approximately equal to $$f \times \frac{r}{R}$$

where R is the radius of the surface with the greater curvature, $r$ the radius of the surface with the smaller curvature and $f$ is the focal length of the condenser.

In testimony whereof I have signed my name to this specification.

MAX BEREK.